United States Patent [19]

Elbl-Weiser

[11] Patent Number: 5,723,525

[45] Date of Patent: Mar. 3, 1998

[54] MOLDING MATERIALS BASED ON POLYARYLENE ETHERS

[75] Inventor: Karin Elbl-Weiser, Schriesheim, Germany

[73] Assignee: BASF Aktiengesellschaft, Ludwigshafen, Germany

[21] Appl. No.: 679,622

[22] Filed: Jul. 12, 1996

[30] Foreign Application Priority Data

Jul. 14, 1995 [DE] Germany ............... 194 25 681.6

[51] Int. Cl.⁶ ............... C08K 3/10; C08K 3/18; C08K 3/26
[52] U.S. Cl. ............................. 524/424
[58] Field of Search ............... 524/402, 401, 524/424

[56] References Cited

U.S. PATENT DOCUMENTS 4,711,945 12/1987 Daniels ........................ 528/86
4,794,155 12/1988 Woo et al. .................... 528/185
4,950,729 8/1990 Daniels ........................ 528/126

FOREIGN PATENT DOCUMENTS 38 43 438  6/1990  Germany.

OTHER PUBLICATIONS

Buchert et al. (translation of DE 38 43 438), Jun. 1990.

*Primary Examiner*—Jeffrey C. Mullis
*Attorney, Agent, or Firm*—Keil & Weinkauf

[57] ABSTRACT

Molding materials containing
  A) from at least 60% by weight of polyarylene ethers are mixed with
  B) from 0.001 to 0.2% by weight of a carbonate or bicarbonate of an alkali metal or a mixture thereof
and furthermore
  C) from 0 to 40% by weight of additives or processing assistants or mixtures thereof based on the components A to C
and a process for producing such molding materials.

11 Claims, No Drawings

MOLDING MATERIALS BASED ON POLYARYLENE ETHERS

The present invention relates to molding materials which contain

A) from 60 to 99.8% by weight of polyarylene ethers,

B) from 0.001 to 0.2% by weight of a carbonate or bicarbonate of an alkali metal and C) from 0 to 40% by weight of additives or processing assistants or mixtures thereof.

The present invention also relates to a process for the preparation of these molding materials and to their use.

DE-A1-38 43 438 disclosed that polyarylene ether sulfones with which from 1 to 50% by weight of a carbonate or bicarbonate of an alkali metal are mixed during processing by injection molding or extrusion in the melt, release less $SO_2$ than corresponding carbonate-free polyarylene ether sulfones during a fire. However, these polyarylene ether sulfones have the disadvantage that films or moldings produced therefrom are not transparent. Moreover, their melt stability is too low for many applications.

Polyarylene ethers which contain terminal hydroxyl groups do not have sufficient melt stability for many applications. In general, the terminal groups are therefore blocked after the polycondensation reaction, generally with methyl chloride. On the one hand, methyl chloride is thought to be carcinogenic. On the other hand, the polyarylene ethers thus prepared often do not satisfactorily comply with the stringent fire protection provisions.

Alternatively, after the polycondensation reaction, polyarylene ethers which contain terminal hydroxyl groups can be purified in the absence of water, preferably by means of a mixture of methanol and acetone. Although this gives polyarylene ethers which have both good melt stabilities and good flameproof properties, the amounts of organic solvents in the preparation process should be kept very small for environmental protection reasons. Moreover, the polyarylene ethers thus prepared have a relatively high residual content of alkali metal halides, with the result that their stress cracking resistance is reduced.

It is an object of the present invention to provide molding materials which are based on polyarylene ethers, in particular polyarylene ethers containing terminal hydroxyl groups, and which do not have the stated disadvantages.

We have found that this object is achieved by the molding materials defined at the outset.

The novel molding materials contain, as component A, from 60 to 99.8% by weight, based on the components A to C, of polyarylene ethers. Preferred novel molding materials contain from 60 to 99.85, in particular from 60 to 99.9, % by weight, based on the components A to C, of polyarylene ethers.

A very wide range of polyarylene ethers may be used as components A. Their arylene groups may be identical or different and, independently of one another, may be an aromatic radical of 6 to 18 carbon atoms. Examples of suitable arylene radicals are phenylene, bisphenylene, terphenylene, 1,5-naphthylene, 1,6-naphthylene, 1,5-anthrylene, 9,10-anthrylene and 2,6-anthrylene. Among these, 1,4-phenylene and 4,4'-biphenylene are preferred. These aromatic radicals are preferably unsubstituted. However, they may carry one or more substituents. Suitable substituents are, for example, alkyl, arylalkyl, aryl, nitro, cyano and halogen. The preferred substituents include alkyl of up to 10 carbon atoms, such as methyl, ethyl, n-propyl, isopropyl, n-hexyl or isohexyl, and aryl of up to 20 carbon atoms, such as phenyl or naphthyl, as well as fluorine and chlorine. The arylene groups may be linked to one another via —O—, —$SO_2$—, —S—, —SO—, —CO—, —N=N—, —COO—, an alkylene radical or a chemical bond. They are preferably linked by —O— and —$SO_2$—.

The preferred polyarylene ethers include polyarylene ether sulfones, among which those having repeating units of the general formula III

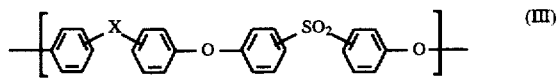

are particularly preferred. Repeating units III whose phenylene radicals are substituted may also be used. Preferred substituents are $C_1$–$C_6$-alkyl, such as methyl, ethyl or t-butyl, phenyl, chlorine and fluorine. X may be —$SO_2$—, —SO—, —S—, —O—, —CO—, —N=N—, —RC=CR$^a$—, —CR$^b$R$^c$— or a chemical bond. Here, R and R$^a$ are each hydrogen, $C_1$–$C_6$-alkyl, eg. methyl, n-propyl or n-hexyl, $C_1$–$C_6$-alkoxy, including methoxy, ethoxy and butoxy, or aryl, in particular phenyl. R$^b$ and R$^c$ may each be hydrogen or $C_1$–$C_6$-alkyl, in particular methyl. However, they may also be linked to one another to form a $C_4$–$C_{10}$-cycloalkyl ring, preferably a cyclopentyl or cyclohexyl ring, which in turn may be substituted by one or more alkyl groups, preferably methyl. R$^b$ and R$^c$ may furthermore be $C_1$–$C_6$-alkoxy, eg. methoxy or ethoxy, or aryl, in particular phenyl. The abovementioned groups may in turn each be substituted by chlorine or fluorine.

The particularly preferred polyarylene ether sulfones include those which contain $a_1$) from 0 to 100% by weight of units I

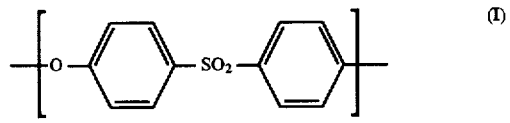

and $a_2$) from 0 to 100% by weight of units II

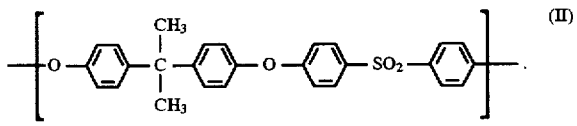

Some of the preferred repeating units III are shown below:

(III)

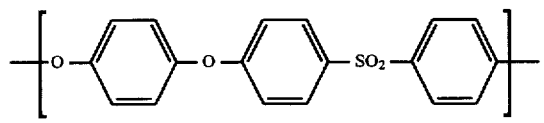

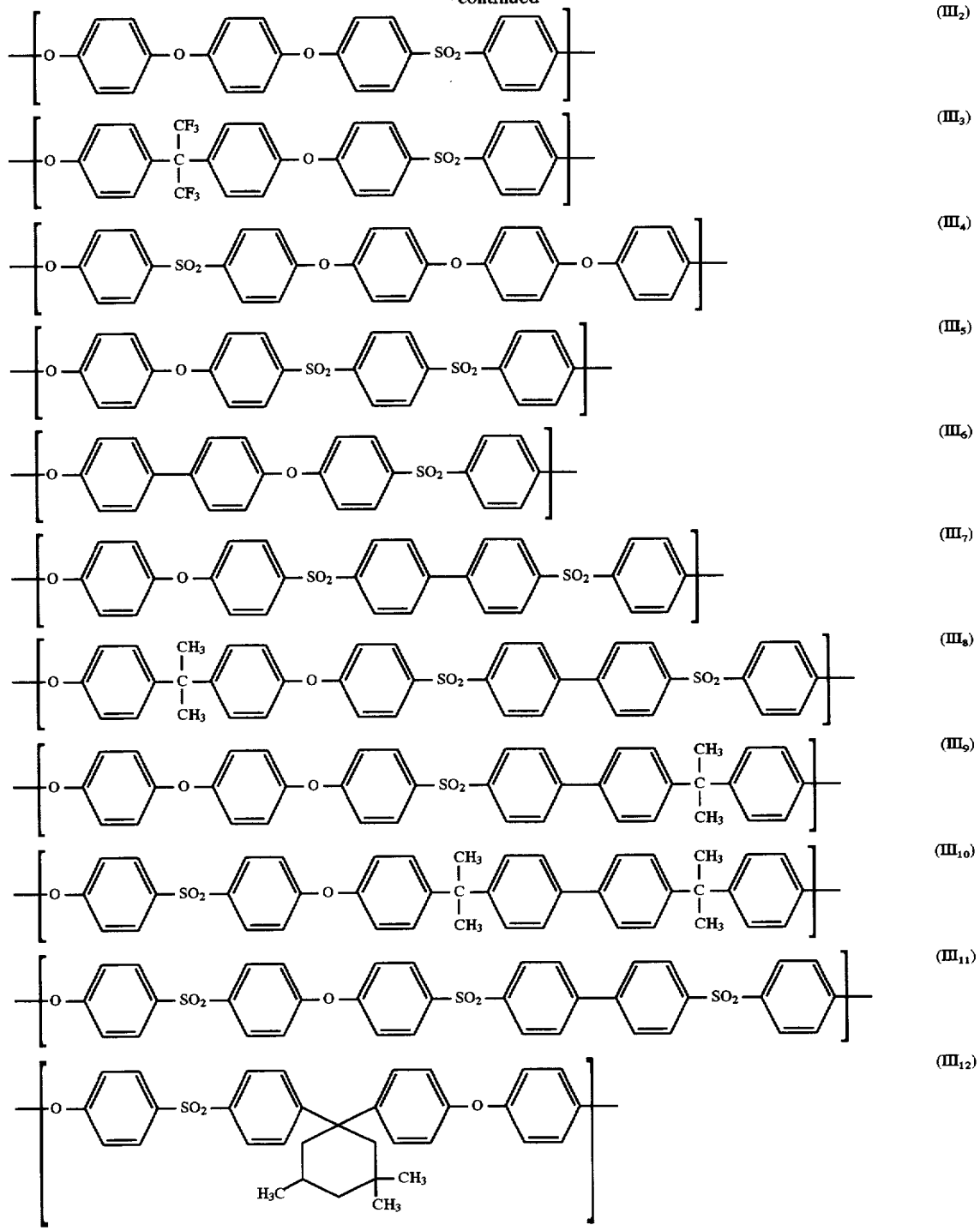

Polyarylene ethers in which from 0.5 to 10, in particular from 1 to 5, % of all terminal groups are terminal hydroxyl groups and from 90 to 99.5, in particular from 95 to 99, % of all terminal groups are terminal chlorine groups are particularly preferred. Very particularly preferred polyarylene ether sulfones are those which contain the units I or II and in which from 0.5 to 10, in particular from 1 to 5, % of all terminal groups are terminal hydroxyl groups and from 90 to 99.5, in particular from 95 to 99, % of all terminal groups are terminal chlorine groups.

The polyarylene ethers according to the invention may also be copolymers or block copolymers in which polyarylene ether segments and segments of other thermoplastic polymers, such as polyamides, polyesters, aromatic polycarbonates, polyester carbonates, polysiloxanes, polyimides or polyether imides, are present. The molecular weights of the blocks or of the grafts in the copolymers are as a rule from 1000 to 30,000 g/mol. The blocks having different structures may be arranged alternately or randomly. The amount of polyarylene ether segments in the copolymers or block copolymers is in general at least 3, preferably at least 10, % by weight. The amount of polyarylene ethers may be up to 97% by weight. Copolymers or block copolymers containing up to 90% by weight of polyarylene ether segments are preferred. Copolymers or block copolymers containing from 20 to 80% by weight of polyarylene ether segments are particularly preferred.

In general, the polyarylene ethers A used according to the invention have number average molecular weights $\overline{M}_n$ of from 10,000 to 60,000 g/mol and viscosity numbers of from 30 to 150 ml/g. Depending on the solubility of the polyarylene ethers, the viscosity numbers are measured either in 1% strength by weight N-methylpyrrolidone solution, in mixtures of phenol and o-dichlorobenzene or in 96% strength sulfuric acid, in each case at 20° C. and 25° C.

Polyarylene ethers which contain terminal hydroxyl groups are known per se or can be prepared by methods known per se. They are formed, for example, by condensation of aromatic bishalogen compounds and the alkali metal double salts of aromatic dihydroxy compounds in suitable molar ratios or by autocondensation of alkali metal salts of hydroxyhaloarylenes in the presence of a catalyst. Particularly preferably, the dihaloarylenes are used in excess. Suitable molar ratios are, for example, from 1.0 to 1.05. The particularly preferably used ratio of the dihaloarylenes to the dihydroxyarylenes is from 1.01 to 1.04.

The monomers are preferably reacted in the melt or in an inert high-boiling solvent. These include chlorobenzene, dichlorobenzene, xylene and trichlorobenzene. Sulfones or sulfoxides, including in particular dimethyl sulfone, diethyl sulfone, 1,1-dioxotetrahydrothiophene (sulfolane) or diphenyl sulfone, dimethyl sulfoxide or diethyl sulfoxide are also suitable, preferably dimethyl sulfoxide. The preferred solvents include N-alkylpyrrolidones, in particular N-methylpyrrolidone. N-substituted amides, for example N,N-dimethylformamide or N,N-dimethylacetamide, may also be used. It is also possible to use mixtures of different solvents.

For example, bisphenols and dihalobenzene compounds may be heated in the presence of anhydrous potassium carbonate in N-methylpyrrolidone at from 100° to 250° C., in particular from 140° to 190° C., while simultaneously distilling off water, until the major part of the water of reaction, for example more than 90%, has been removed. The reaction can be carried out at atmospheric or superatmospheric pressure, for example up to 5 bar, in the course of from 1 to 3 hours. The reaction mixture can then be kept at the stated temperature for a further time, for example up to 10 hours, with thorough mixing. All process steps, including the working up, are preferably carried out under an inert gas atmosphere.

After the polycondensation, the alkali metal halides formed in the reaction are as a rule first removed. It has proven advantageous to reduce the content of alkali metal salts to below 100 ppm, preferably below 10 ppm, based on the polyarylene ethers A. Separation means known per se, for example clarifying filters or centrifuges, may be used for separating off the alkali metal halides, which are generally suspended in the reaction solution. For example, it is also possible to treat the polyarylene ethers several times with water or to purify them with water in addition to the physical purification steps.

For further processing, the polyarylene ethers A thus obtained can be washed with water, dried and, for example, granulated.

The novel molding materials contain, as a further component, from 0.001 to 0.2% by weight, based on the components A to C, of a carbonate or bicarbonate of an alkali metal. This component B is preferably present in the novel molding materials in amounts of from 0.003 to 0.15, in particular from 0.005 to 0.1, % by weight, based on the components A to C. Mixtures of different carbonates and bicarbonates may also be used. Examples are sodium carbonate, sodium bicarbonate, potassium carbonate and potassium bicarbonate. Sodium carbonate or potassium carbonate is particularly preferably used as component B.

The novel molding materials may contain, as component C, additives or processing assistants or mixtures thereof. The amount thereof is from 0 to 40, preferably from 0 to 30, % by weight, based on the components A to C.

Conventional additives are, for example, UV stabilizers, lubricants, mold release agents, dyes, pigments and plasticizers.

Examples of UV stabilizers are various substituted resorcinols, salicylates, benzotriazoles and benzophenones, which are used in general in amounts of up to 2% by weight.

Lubricants and mold release agents, which are added as a rule in amounts of up to 1% by weight of thermoplastic material, are stearic acid, stearyl alcohol, alkyl stearates and stearamides and esters of pentaerythritol with long-chain fatty acids. Salts of calcium, of zinc or of aluminum with stearic acid and dialkyl ketones, eg. distearyl ketone, may also be used.

Furthermore, the novel molding materials may contain reinforcing materials or fillers as component C. Preferred fillers or reinforcing materials are carbon fibers, potassium titanate whiskers, aramid fibers and particularly preferably glass fibers. Particularly suitable particulate fillers are calcium silicates, such as wollastonite or kaolin (in particular calcined kaolin) or glass beads. A preferred combination of fillers comprises, for example, glass fibers with wollastonite.

The alkali metal carbonate or bicarbonate B may be mixed with the solid polyarylene ether A as powder or solution, preferably as aqueous solution. Thorough mixing is advantageous. A low-speed stirrer or fluid mixer may be used, for example, for this purpose. Thereafter, additives or processing assistants C may be added and the mixture melted and further processed from the melt, for example by extrusion or injection molding.

The component B may, however, also be added to the melt of the polyarylene ether A as powder or in solution, preferably aqueous solution. The residence time in the extruder depends on the type of polyarylene ether and on the temperatures of the melt. For polyarylene ethers which contain terminal hydroxyl groups, it should be sufficiently long for the alkali metal carbonates or bicarbonates having the hydroxyl groups to have reacted to form phenolate groups. The reaction time may be, for example, from 1 to 30, preferably from 2 to 15, minutes.

The additives or processing assistants may be added to the melt beforehand, subsequently or simultaneously with the component B.

The novel molding materials have melt stabilities and flameproof properties adapted to the respective requirements. They are suitable for the production of moldings, films and fibers, in particular in areas where good flameproof properties are desired. Examples are household appliances, electronic and electrical equipment, such as chip trays or cable sheets, and interior trim of means of transport, in particular public transport, such as buses, railways or aircraft.

EXAMPLES

Analysis

The viscosity numbers (VN) were determined in each case using 1.0% strength by weight solutions in N-methylpyrrolidone (NMP) at 25° C. The accuracy of measurement was ± 1 VN unit.

The content of terminal hydroxyl groups was determined by potentiometric titration. For this purpose, the terminal groups present as phenol groups were converted into phenolate groups by means of tetrabutylammonium hydroxide. By adding acid, the terminal groups already present as phenolate groups were converted into free phenol groups, which can be determined potentiometrically. The accuracy of measurement was ±0.001% by weight.

Preparation of a polyarylene ether sulfone

A polyarylene ether sulfone having repeating units

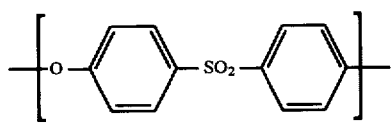
(I)

was prepared by reacting dihydroxydiphenyl sulfone and dichlorodiphenyl sulfone in a molar ratio of 1:1.035 in the presence of potassium carbonate in NMP as solvent. The potassium chloride obtained during the polycondensation was removed from the reaction mixture by filtration under pressure.

The reaction mixture was precipitated in water, collected and extracted with hot water in order to remove the NMP and potassium chloride as completely as possible. After drying, the white powder was melted in an extruder at 330° C. and then granulated. The polymer granules had a viscosity number of 47.2. The content of terminal hydroxyl groups was 0.011% by weight, based on the weight of polymer; the amount of organically bonded chlorine was 0.47% by weight, based on the weight of polymer, ie. 4.7% of all terminal polymer groups were present as terminal hydroxyl groups and 95.3% of all terminal groups were present as terminal chlorine groups. The potassium content of the product was determined as 37 ppm and the chloride content as 40 ppm.

Example 1 According to the Invention

A part of the polymer granules which had been worked up as described above was mixed with 0.1% by weight of potassium carbonate in a stirrer.

The mixture was then melted in a twin-screw kneader (ZSK 25 from Werner and Pfleiderer) at 330° C. and 100 rpm and the melt was devolatilized at 70 mbar and then granulated.

The polymer had a viscosity number of 48.2. The content of terminal hydroxyl groups was 0.005% by weight, based on the weight of polymer; the amount of organically bonded chlorine was 0.47% by weight, based on the weight of polymer, ie. 55% of all terminal hydroxyl groups were present as phenolate groups. The potassium content of the product was determined as 610 ppm and the chloride content as 55 ppm.

Shaped articles produced from these granules exhibited a slight haze but were still translucent.

Example 2 According to the Invention

A part of the polymer powder which had been prepared as above was melted in a twin-screw kneader (ZKS 25 from Werner and Pfleiderer) at 330° C. A 4% strength aqueous potassium carbonate solution was sprayed into the melt by means of a metering pump in an amount such that the amount of potassium carbonate accounted for 0.1% by weight of the amount of polymer. The melt was devolatilized at 70 mbar and then granulated.

The polymer had a viscosity number of 47.9. The content of terminal hydroxyl groups was 0.003% by weight, based on the weight of polymer; the amount of organically bonded chlorine was 0.47% by weight, based on the weight of polymer, ie. 73% of all hydroxyl groups were present as phenolate groups. The potassium content of the product was determined as 590 ppm and the chloride content as 65 ppm.

Shaped articles produced from these granules exhibited a slight haze but were still translucent.

Comparative Example 1 (CE1)

A part of the polymer granules which had been worked up as described above was mixed with 1.0% by weight of potassium carbonate in a stirrer.

The mixture was then melted in a twin-screw kneader (ZSK 25 from Werner and Pfleiderer) at 330° C and 100 rpm and the melt was devolatilized at 70 mbar and then granulated.

The polymer had a viscosity number of 56.8. In comparison with the polymer used, the viscosity was significantly higher since a further, undesirable increase in molecular weight had taken place in the melt.

The content of terminal hydroxyl groups was 0.002% by weight, based on the weight of polymer; the amount of organically bonded chlorine was 0.37% by weight, based on the weight of polymer. After redissolution of the granules and subsequent precipitation of the polymer in water containing acetic acid, washing and drying, a content of 0.012% by weight of terminal hydroxyl groups was determined. This indicates that 83% of all hydroxyl groups were present as phenolate groups. The potassium content of the product was determined as 5600 ppm and the chloride content as 270 ppm. Shaped articles produced from these granules exhibited a pronounced haze and were no longer translucent.

Comparative Example 2 (CE2)

A part of the polymer granules which had been worked up as described above was mixed with 0.1% by weight of calcium carbonate in a stirrer.

The mixture was then melted in a twin-screw kneader (ZSK 25 from Werner and Pfleiderer) at 330° C. and 100 rpm and the melt was devolatilized at 70 mbar and then granulated.

The polymer had a viscosity number of 47.5.

The content of terminal hydroxyl groups was 0.012% by weight, based on the weight of polymer; the amount of organically bonded chlorine was 0.47% by weight, based on the weight of polymer. This indicates that the terminal hydroxyl groups were not converted to their corresponding phenolates.

Shaped articles produced from these granules exhibited a haze and were no longer translucent.

Testing of performance characteristics

The plammabilty of the polyarylene ether sulfones prepared by the novel process was determined by the UL-94 test. For this purpose, test specimens (127×12.7×0.8 or 0.4 mm) were clamped perpendicularly in a holder and a Bunsen burner flame having a flame height of 20±2 ram was applied at the lower end. The flame was applied to each test specimen twice for 10 seconds and the combustion time after each flame application was measured, and the total combustion time of a set of five test specimens was calculated therefrom. A cotton wool ball which could be ignited by dripping flaming particles was present 300 mm below the test specimens. Classification in the appropriate fire classes was in accordance with UL-94, based on the following criteria:

| Fire class | Combustion time [s] | Total combustion time [s] | Dripping flaming particles |
|---|---|---|---|
| V-0 | ≦10 | ≦50 | no |
| V-1 | ≦30 | ≦250 | no |
| V-2 | ≦30 | ≦250 | yes, with ignition of the cotton wool |
| V-- | no allocation to the above classes possible | | |

The results of the UL-94 test are shown in the table below.

| | Fire class with different sample thicknesses | | |
|---|---|---|---|
| Example | 1.6 mm | 0.8 mm | 0.4 mm |
| According to the invention: | | | |
| 1 | V-0 | V-0 | V-0 |
| 2 | V-0 | V-0 | V-0 |
| For comparison: | | | |
| Polyether sulfone without additions | V-0 | V-2 | V-2 |
| CE1 | V-0 | V-0 | V-0 |
| CE2 | V-0 | V-2 | V-2 |

The processing stability was determined by measuring the melt viscosity of the samples in a capillary viscometer at 400° C. and a shear rate of 1000 s$^{-1}$ after thermal stress for one minute and for 55 minutes. The quotient of these two viscosity values is a measure of processing stability and is ideally 1.

The polyarylene ether sulfone worked up as above and containing no additives had a stability value of 1.23. The novel polyarylene ether sulfones (Examples 1 and 2) had the same stability values within the accuracy of measurement.

In order to test the heat stability, circular disks were produced from the molding materials described and were stored for 10 days at 220° C. The circular disks comprising the polyether sulfone without additives and those comprising polyether sulfone prepared according to CE2 exhibited a strong brownish yellow discoloration after storage. In contrast, the circular disks comprising the novel molding materials were not significantly discolored.

The table below summarizes the results of the measurements. The DB value is a measure of the change in the Yellowness Index obtained from the comparison of the values before and after storage. The more positive the value, the stronger is the yellow color. The DL value is a measure of the light/dark value and describes the change before/after storage. The more positive the DL value, the lighter is the hue.

Since the circular disks comprising molding materials prepared according to CE1 were not sufficiently transparent, their light/dark values could not be evaluated together with those of the other circular disks.

| Example | DB value | DL value |
|---|---|---|
| According to the invention: | | |
| 1 | 4.45 | −0.66 |
| 2 | 5.23 | −0.16 |
| For comparison: | | |
| Polyether sulfone without additives | 23.46 | −12.74 |
| CE2 | 21.51 | −11.95 |

We claim:

1. A process for the preparation of a molding material, wherein
    A) from at least 60% by weight of polyarylene ethers are mixed with
    B) from 0.001 to 0.2% by weight of a carbonate or bicarbonate of an alkali metal or a mixture thereof
    and furthermore
    C) from 0 to 40% by weight of additives or processing assistants or mixtures thereof based on the components A to C.

2. A process as defined in claim 1, wherein as polyarylene ethers A, polyarylene ether sulfones having repeating units
    a$_1$) from 0 to 100% by weight of units I

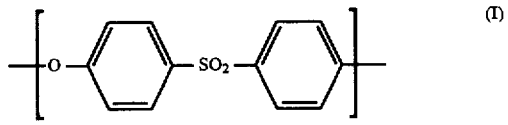

and
    a$_2$) from 0 to 100% by weight of units II

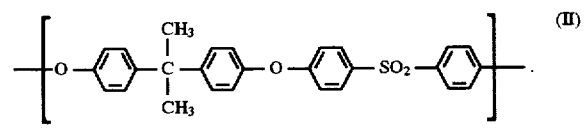

are used.

3. A process as defined in claim 1 wherein the polyarylene ethers A are polyarylene ethers having terminal hydroxy groups.

4. A process as defined in claim 3, wherein the polyarylene ethers are polyarylene ether sulfones having repeating units
    a$_1$) from 0 to 100% by weight of units I

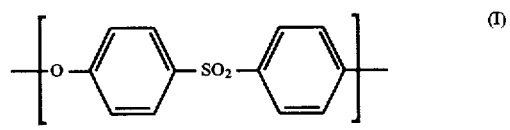

and
    a$_2$) from 0 to 100% by weight of units II

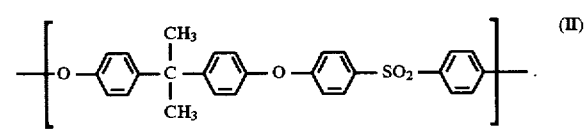

5. A process as defined in claim 1, wherein the alkali metal salt content in the polyarylene ethers is reduced after the polycondensation thereof to below 100 ppm prior to mixing with the carbonate or bicarbonate of an alkali metal.

6. A process as defined in claim 1, wherein the alkali metal salt content in the polyarylene ethers is reduced after the polyycondensation thereof to below 10 ppm prior to mixing with the carbonate or bicarbonate of an alkali metal.

7. A process as defined in claim 1, wherein the component B is mixed with the solid polyarylene ether A.

8. A process as defined in claim 7, wherein an aqueous solution of component B is used.

9. A process as defined in claim 1, wherein the component B is added to the melt of the polyarylene ether.

10. A process as defined in claim 9, wherein an aqueous solution of component B is used.

11. A process as defined in claim 1 wherein component B is potassium carbonate.

* * * * *

UNITED STATES PATENT AND TRADEMARK OFFICE
CERTIFICATE OF CORRECTION

PATENT NO.: 5,723,525

DATED: March 3, 1998

INVENTOR(S): ELBL-WEISER, Karin

It is certified that error appears in the above-identified patent and that said Letters Patent is hereby corrected as shown below:

On the cover page, item [30], the foreign application priority application number "194 25 681.6" should be --195 25 681.6--.

Column 10, claim 6, line 66, "polyycondensation" should be --polycondensation--.

Signed and Sealed this

Twenty-sixth Day of May, 1998

*Attest:*

BRUCE LEHMAN

*Attesting Officer*     *Commissioner of Patents and Trademarks*